United States Patent
Hermle et al.

[15] 3,654,034
[45] Apr. 4, 1972

[54] APPARATUS FOR POSITIONING STRIP ENDS IN A SPLICING ALIGNMENT

[72] Inventors: Paul A. Hermle; Philip A. Payne, both of Rochester, N.Y.

[73] Assignee: Eastman Kodak Company, Rochester, N.Y.

[22] Filed: Apr. 21, 1969

[21] Appl. No.: 817,870

[52] U.S. Cl.................................156/502, 156/391, 156/505, 156/539, 156/544, 156/545
[51] Int. Cl.................................................................B31f 5/00
[58] Field of Search..................156/502, 505, 506, 507, 391, 156/539, 544, 545

[56] References Cited

UNITED STATES PATENTS

| | | | |
|---|---|---|---|
| 2,923,195 | 2/1960 | Reibel et al. | 156/502 X |
| 3,136,678 | 6/1964 | Herzig | 156/502 |
| 962,381 | 6/1910 | Nickerson et al. | 156/507 |

FOREIGN PATENTS OR APPLICATIONS

| | | | |
|---|---|---|---|
| 154,748 | 1938 | Austria | 156/502 |
| 545,736 | 1956 | Italy | 156/502 |

Primary Examiner—Carl D. Quarforth
Assistant Examiner—R. L. Tate
Attorney—Robert W. Hampton and Steve W. Gremban

[57] ABSTRACT

Splicing mechanism and method wherein the splicing mechanism has a strip-end positioning member movable to a first position in which an end of a first strip placed thereon is positioned in alignment with a previously positioned end of a second strip and in spaced registering relation to a tape to which the end of the second strip is secured. Upon arresting the first strip and moving the strip-end positioning member toward a second position, the end of the first strip is released for movement by any suitable means into splicing engagement with the tape.

4 Claims, 5 Drawing Figures

Patented April 4, 1972
3,654,034
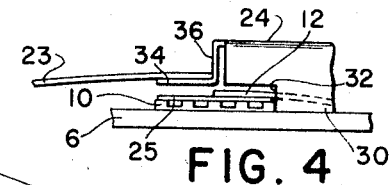
FIG. 4
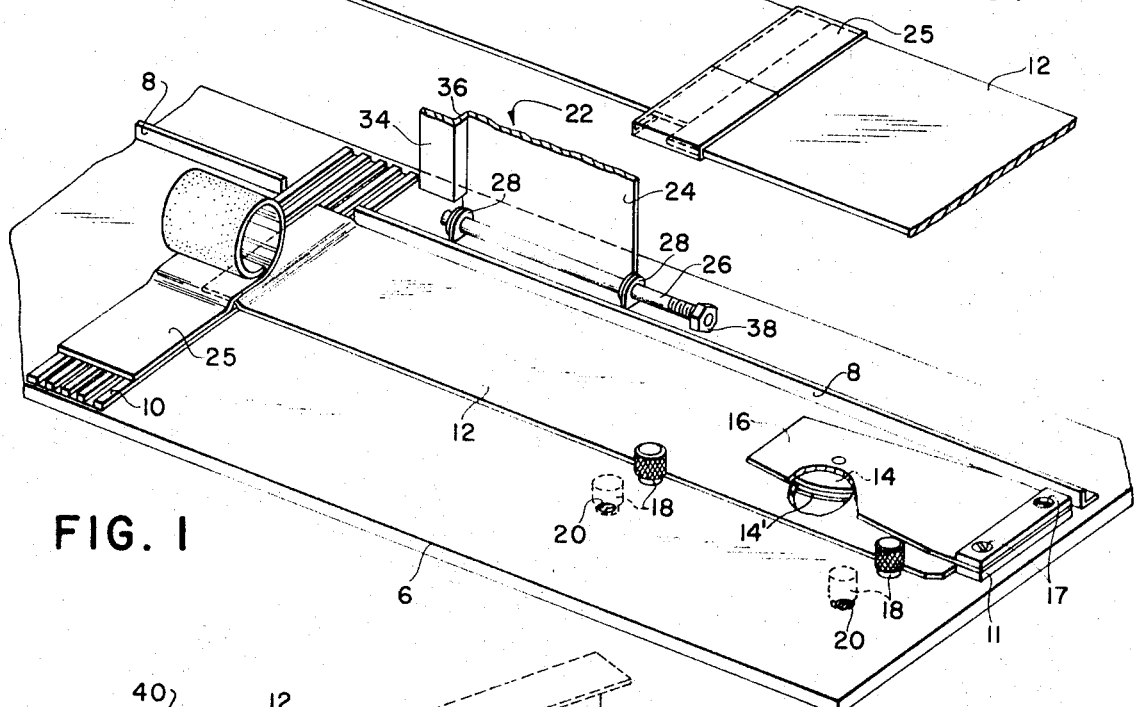
FIG. 5
FIG. 1
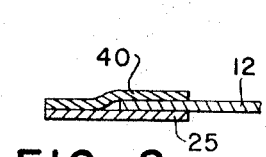
FIG. 2
FIG. 3
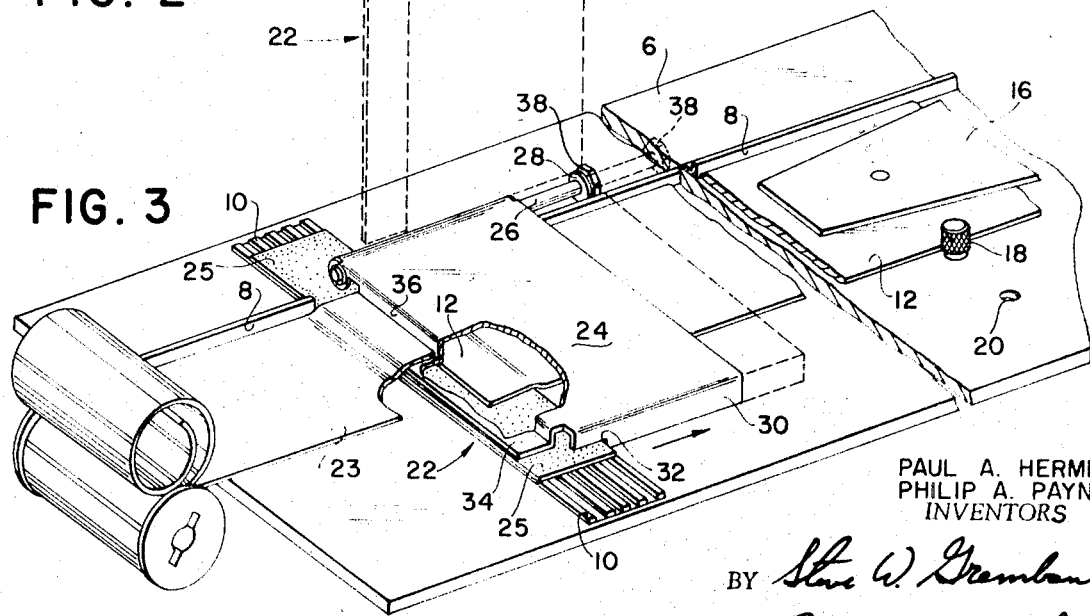
PAUL A. HERMLE
PHILIP A. PAYNE
INVENTORS
BY Steve W. Gremban
Robert W. Hampton
ATTORNEYS

3,654,034

APPARATUS FOR POSITIONING STRIP ENDS IN A SPLICING ALIGNMENT

BACKGROUND OF THE INVENTION

Splicing mechanisms and methods for splicing strips of material are well known in the art. Such splicing mechanisms are particularly useful for splicing film strips together in abutting relation, and in the photofinishing industry, for example, for splicing a leader to strip or roll film or for splicing ends of rolls of film to form a long web in preparation for processing. Since some splicing operations have to be performed under dark room conditions, the splicing mechanism must be of simple construction for easy manipulation under such conditions. The splicing mechanism of this invention is primarily intended for dark room use for splicing the end of a film to a reusable leader strip of predetermined dimensions.

SUMMARY OF THE INVENTION

This invention includes within its scope a splicing mechanism and method for splicing ends of strips of material such as film preferably in abutting relation. The splicing mechanism has a strip-end positioning member movable to a first position in which an end of a first strip placed on the member is spaced from and in alignment with an end of a second strip previously secured to a tape. Upon arresting the first strip and moving the positioning member from its first position toward a second position, the end of the first strip is released for movement by any suitable means into engagement with the tape, preferably while in abutting relation to the second strip end.

One of the objects of the present invention is to provide a splicing mechanism for splicing the ends of strip material, preferably in abutting relation.

Another object of the invention is to provide a splicing mechanism that is of simple design and construction, easy to operate particularly under dark room conditions, thoroughly reliable, and economical to manufacture.

Another object of the invention is to provide an improved splicing mechanism for dark room use for reliably splicing the ends of film and leader strips in abutting relation without damaging the film.

Objects and advantages other than those set forth above will be apparent from the following description when read in connection with the accompanying drawing.

BRIEF DESCRIPTION OF THE DRAWING

FIG. 1 is a perspective view of the splicing mechanism of this invention showing a leader, a tape being pressed onto the leader end, and a fragment of a strip-end positioning member in a second position;

FIG. 2 is a segmental view in section of a leader end, tape and an overcoat for the tape;

FIG. 3 is a perspective view of the splicing mechanism showing in full lines the strip-end positioning member in its first position for positioning a film end in spaced relation to and preferably in abutting alignment with another strip end;

FIG. 4 is a segmental, side elevational view of the strip-end positioning member of FIG. 3; and FIG. 5 is a segmental view in perspective showing a completed splice with the strip ends in abutting relation.

DESCRIPTION OF THE PREFERRED EMBODIMENT

Referring to the drawing, the splicing mechanism of this invention comprises a base plate 6 to which aligned, spaced apart guide rails 8 are secured for guiding the edges of strip material such as film or leader material. A ribbed support plate 10 is mounted on base 6 transversely thereof with one end extending through the space between guide rails 8. A stop bar 11 is mounted on base 6 adjacent one end thereof to provide a stop for one end of a strip material shown as a leader 12 of predetermined length. A clamp device of any suitable type for clamping leader 12 to base 6 in one plane comprises a magnet 14 secured adjacent the free end of a flexible spring member 16, the opposite end of the spring member being secured to stop bar 11 by screws 17 or the like. The magnet 14 cooperates with a similar registering magnet 14' mounted in base 6 and having a polarity reversed with regard to the polarity of magnet 14 so that the two magnets 14, 14' are attracted together with considerable force for clamping the leader 12 therebetween. A pair of pins 18 cooperating with suitable openings in base 6 are provided for guiding the outer edge of leader 12. Two additional pin holes 20 are shown to accommodate pins 18 when a leader of greater width is to be used.

The splicing mechanism has a strip-end positioning means shown generally at 22 which is movable from a second position as seen in FIG. 1 to a first position as seen in full lines in FIG. 3 for properly positioning the end of a film strip 23 or the like placed on the positioning means. In this first position, the end of filmstrip 23 lies in a plane parallel to the plane of leader 12 and is positioned in spaced relation to a tape 25 and in abutting alignment with the end of leader 12 affixed to the tape. The strip-end positioning means 22 comprises a plate member 24 having one end secured to a support rod 26 which is pivotally and slidably movable in openings in support brackets 28 secured to base 6. The plate member 24 has a bent end 30, one edge 32 of which forms a stop member. As best seen in FIGS. 3 and 4, when plate member 24 is moved to its first position, end 30 engages base 6 and edge 32 engages support bar 10. In this first position, a shelf 34 on member 24 is spaced from support bar 10, and a side 36 of member 24, which connects shelf 34 to plate 24, forms a stop for one end of film 23. In this position, the end of film 23 is spaced above tape 25 and in registration or alignment with the end of leader 12. A spring, not shown, may be interposed between plate member 24 and base 6 for normally biasing member 24 to its upward second position as best seen in dotted lines.

Although edge 32 of end 30 provides the means for laterally locating the positioning means 22 in its first position so that the ends of film 23 and leader 12 are in spaced relation and in position for movement into abutting relation, this function may be accomplished by providing an adjustable nut 38 on a threaded end of rod 26. The degree or extent of lateral or axial movement of member 24 on rod 26 for positioning the aligned film and leader ends in proper relation to one another, that is in spaced apart, or abutting or overlapping relation, is controlled by adjusting the position of nut 38.

In the operation of this invention, a leader 12 of predetermined length is inserted between clamp 16 and base 6 with one end thereof moved into engagement with stop bar 11, one edge of leader 12 bearing against guide rail 8 and the opposite edge thereof bearing against pins 18. In this position, as best seen in FIG. 1, the opposite end of leader 12 rests on ribbed plate 10. With leader 12 being held in this position, a pressure sensitive tape 25 of predetermined length is placed over the leader end as seen in FIG. 1 with the adhesive side facing the leader and pressed into engagement therewith. The leader and tape assembly may be removed from the splicing mechanism, and if desired an overcoat 40 may be placed over the adhesive on tape 25 as seen in FIG. 2, and the assembled leader and tape stored in this condition for future use. If the leader and tape assembly is to be used immediately, the assembly is removed from base 6 of the splicing mechanism, inverted or rotated through 180°, and then replaced on base 6 beneath clamp 16 with the same end thereof in engagement with stop bar 11, and the edges thereof interposed between guide rails 8 and pins 18. In this position, the back of tape 25 rests on ribbed support 10 with the adhesive surface of tape 25, which is affixed to the end of leader 12, facing upwardly. The strip-end positioning plate 24, by a combined pivotal and sliding motion, is moved into its first position, as seen in full lines in FIGS. 3 and 4. While plate 24 is held in its first position, the end of the roll of film 23 to be spliced to leader 12 is positioned on shelf 34 and moved into engagement with side 36 of plate 24 while one edge of film 23 is held in engagement with guide rail 8. While the film end is preferably manually arrested or held in this position, the positioning plate 24 is pivoted upwardly or slidably moved in the direction of the arrow seen in FIG. 3 to its second position withdrawing shelf 34 from the film end. The released film end is pressed downwardly by any suitable means into engagement with the adhesive on tape 25 positioned therebelow. The ends of tape 25 extending beyond the side edges of the leader and film may be bent over and pressed into engagement with the opposite side of the leader and film, as best seen in FIG. 5, to complete the splice.

The invention has been described in detail with particular reference to a preferred embodiment thereof, but it will be understood that variations and modifications can be effected within the spirit and scope of the invention.

We claim:

1. In a splicing mechanism for orienting ends of first and second strips of material to be spliced, the combination comprising:

support means for supporting the first strip with one end thereof lying in a first plane and in a predetermined position; and positioning means for supporting one end of the second strip and movable relative to said support means between a first position, in which the one end of the second strip is in alignment with the one end of the first strip but positioned in a plane parallel to said first plane, and a second position, whereby the movement from said first position to said second position results in the release of the one end of the second strip from said positioning means for movement into said first plane in proper alignment to be spliced to the one end of the first strip.

2. The invention according to claim 1 wherein said positioning means comprises a member having a shelf for supporting the one end of the second strip.

3. The invention according to claim 2 wherein said member is mounted on said support means for lateral and pivotal movement between said first and second positions.

4. The invention according to claim 2 wherein said shelf is spaced from said support means when said positioning means is in said first position.

* * * * *